US006994318B2

(12) United States Patent
Burke

(10) Patent No.: US 6,994,318 B2
(45) Date of Patent: Feb. 7, 2006

(54) FAUCET SPOUT ATTACHMENT

(75) Inventor: David J. Burke, Brick, NJ (US)

(73) Assignee: Component Hardware Group, Inc., Lakewood, NJ (US)

( * ) Notice: Subject to any disclaimer, the term of this patent is extended or adjusted under 35 U.S.C. 154(b) by 80 days.

(21) Appl. No.: 10/695,303

(22) Filed: Oct. 28, 2003

(65) Prior Publication Data

US 2005/0087717 A1 Apr. 28, 2005

(51) Int. Cl.
*F16K 31/00* (2006.01)

(52) U.S. Cl. ........................ 251/251; 251/78; 251/263; 137/801

(58) Field of Classification Search .................. 251/78, 251/251, 262, 263; 137/801; 4/619, 678
See application file for complete search history.

(56) References Cited

U.S. PATENT DOCUMENTS 4,181,987 A * 1/1980 Kesselman ..................... 4/678
5,361,804 A * 11/1994 Keller et al. ................ 137/801

* cited by examiner

*Primary Examiner*—J. Casimer Jacyna
(74) *Attorney, Agent, or Firm*—Francis C. Hand, Esq.; Carella, Byrne, Bain, et al.

(57) ABSTRACT

The faucet spout attachment includes a handle that is moved by a user during use from a rest position into a rear position or forward position from which the handle is spring-biased back to the rest position when released. A cam is actuated by the handle that allows the handle to be moved into a locked position for hands-free operation. The handle is mounted on the lower housing piece of a two-piece housing that is rotatable relative to the upper housing piece to allow for alignment of the handle for proper use.

24 Claims, 3 Drawing Sheets

FAUCET SPOUT ATTACHMENT

This invention relates to a faucet spout attachment.

As is known, commercial kitchens are required by rule or regulation to have workers that handle food to be clean and, in particular, to frequently wash their hands during the preparation and serving of food.

In many commercial establishments, rather than employ sinks with a tap or valve which is spaced from a water spigot, lever-like attachments have been secured at the open end of the spigots in order to facilitate the turning on and off of the spigot for the washing of a user's hands. In such cases, the user simply pushes the lever-like attachment backwardly to open the spigot and allow water to flow from the spigot. Once hand-washing has been completed, the lever-like attachment automatically returns to a closed position under a spring bias. An example on one such attachment is illustrated in U.S. Design Pat. No. 253,905. However, such lever-like attachments do not have a hold open position for a full on position of a faucet. Further, these types of spout attachments need to be accurately positioned when threaded onto a spout in order to properly align the handle for use.

Electronic faucets have also been known. However, such faucets tend to be unreliable, expensive and unsuited to kitchen and restroom environments.

Accordingly, it is an object of the invention to provide a faucet spout attachment that can remain in a fully open position during use.

It is another object of the invention to simplify the mounting and alignment of a spout attachment on a water spout.

Briefly, the invention provides a faucet spout attachment having a housing for conducting a flow of water and a handle to allow a flow of water from the housing that is disposed in a rest position located in the projected path of flow from the housing.

In one embodiment, the housing is formed of two pieces, for example, of metal. One piece includes an internally threaded end for securement to a water faucet spout and defines a passage for a flow of water. The second piece is secured to the first piece in coaxial relation and includes a further passage for a flow of water. In addition, the second piece is rotatable with respect to the first piece to allow alignment of the handle into a proper position for use.

The attachment also has a valve body mounted in the second piece for movement between a retracted position allowing water to flow from the first passage into the second passage and an extended position within the second piece to block a flow of water from the first passage into the second passage.

In this embodiment, a spring is disposed in the second piece of the housing for biasing the valve body from the retracted position towards the extended position.

In addition, a cam is rotatably mounted in the second housing piece in abutment with the valve body for moving the valve from the extended position to the retracted position. This cam is secured to the handle so as to be rotated thereby. For example, when the handle is moved rearwardly by a user, the cam is rotated to push the valve body towards the retracted position, thereby allowing water to flow from the housing. When released, the handle is able to return to the rest position under the bias of the spring assisted by water pressure.

The cam for moving the valve body has an intermediate section with a flat surface that engages the valve body when the valve body is in the extended position. As the cam rotates, the flat surface moves relative to the valve body so as to move the valve body against the force of the spring to move in the housing.

The intermediate section of the cam may also be formed with an edge surface to engage the valve body in the fully retracted position thereof when the handle is rotated forwardly of the housing. When the handle is in this position, there is a continuous flow of water through the attachment for a hands-free operation. A manual force is then required in order to release the handle from this forward position in order to allow the handle to spring back to the rest position after being pushed off the edge surface (i.e. a "hold open" position).

The edge surface that is formed on the intermediate section of the cam may be provided by having a second flat surface that intersects with the first flat surface to define the edge.

These and other objects and advantages of the invention will become more apparent from the following detailed description taken in conjunction with the accompanying drawings, wherein.

Figure 1:
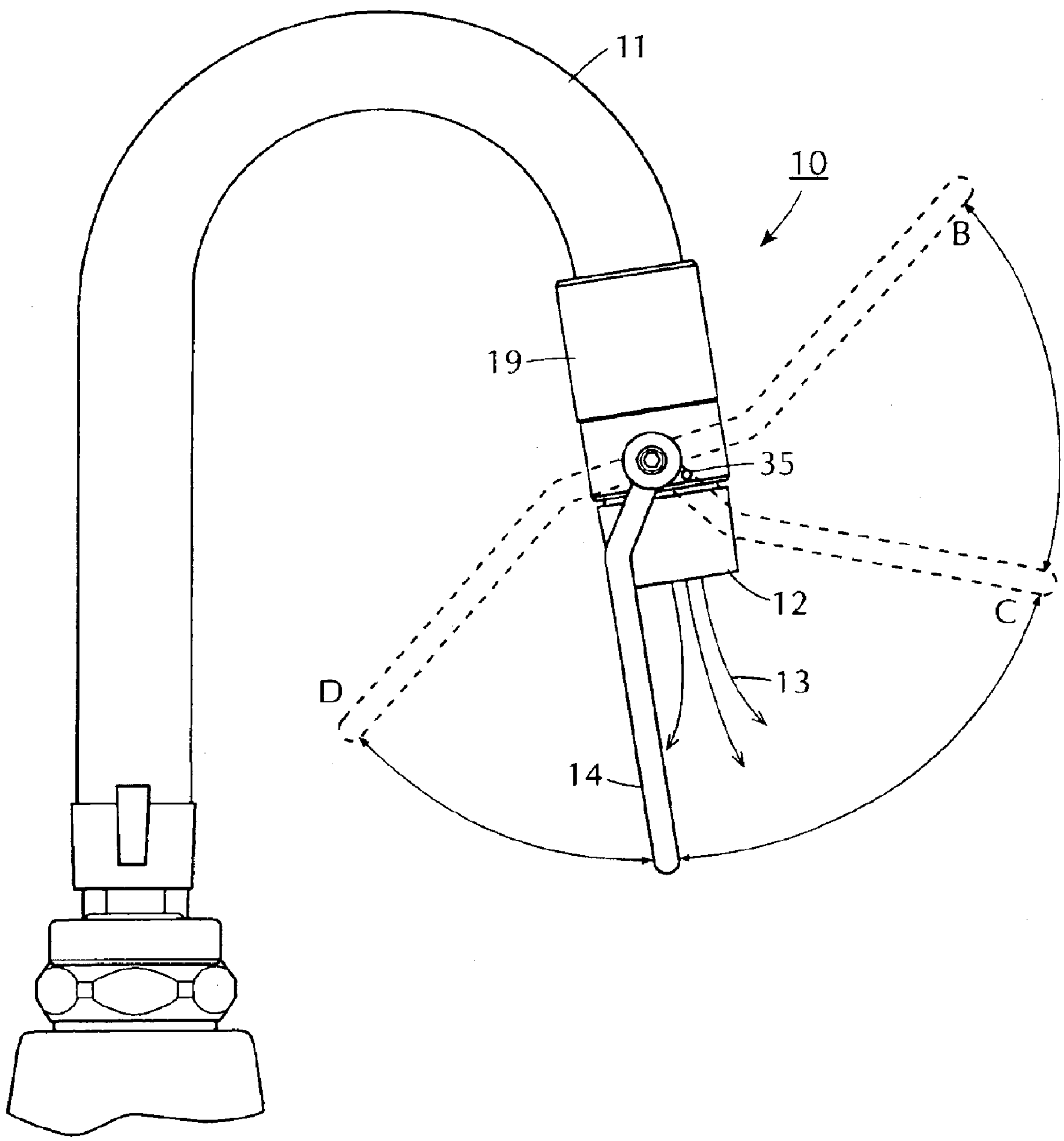
FIG. 1 illustrates a faucet spout attachment constructed in accordance with the invention, attached to a spigot.

Referring to FIG. 1, the faucet spout attachment 10 is constructed to be secured to a water faucet 11 of conventional structure.

An aerator 12 is also secured to the spout attachment 10 in a conventional manner. The spout attachment 10 and aerator 12 serve to direct a flow of water 13 downwardly in a direction indicated by the arrows.

The spout attachment 10 includes a handle 14 for activating the attachment 10. As illustrated, the rest position of the handle 14 is located in parallel to and is spaced from the projected path of flow of water. During use, the handle 14 is moved from the depending rest position rearwardly, for example, over a 45° angle, to the position D illustrated in dotted line. Upon release, the handle 14 will automatically return to the rest position.

Alternatively, the handle 14 may be moved forwardly, for example, over a 45° angle, to the position C indicated in dotted line. Also, upon release, the handle 14 will return to the rest position. The handle 14 may also be moved to a raised "hold open" position between position C and a higher stop position B, i.e. over an angle of 90° from the rest position, to be held open for hands-free operation. From this "hold open" position, the handle requires manual return to the rest position. However, when between the "hold open" position and position B, the handle is biased into position C.

Figure 3B:
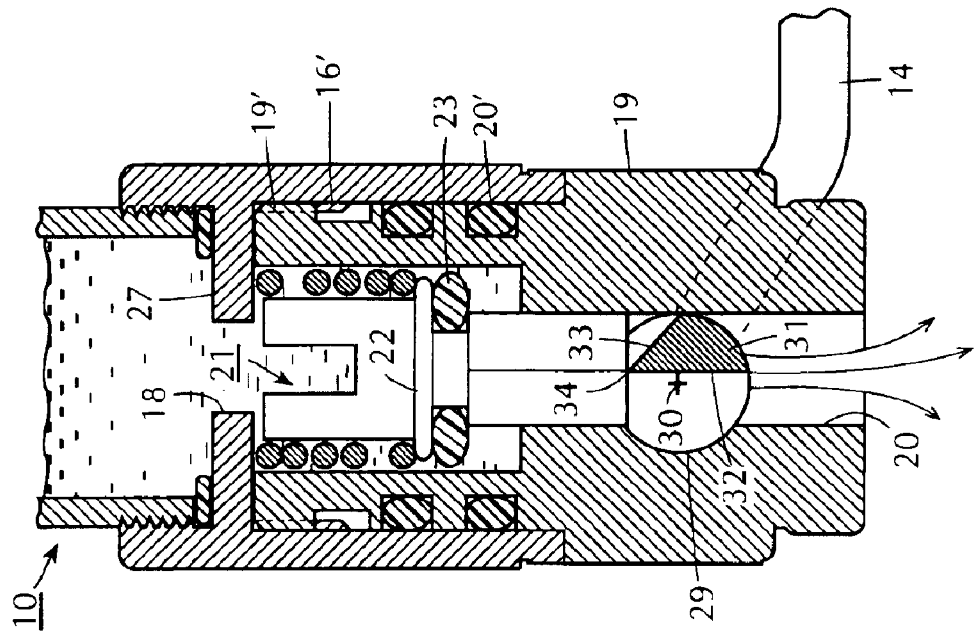
FIG. 3B illustrates a view similar to FIG. 3A with the handle of the spout attachment in a forward, locked position.
Figure 3A:
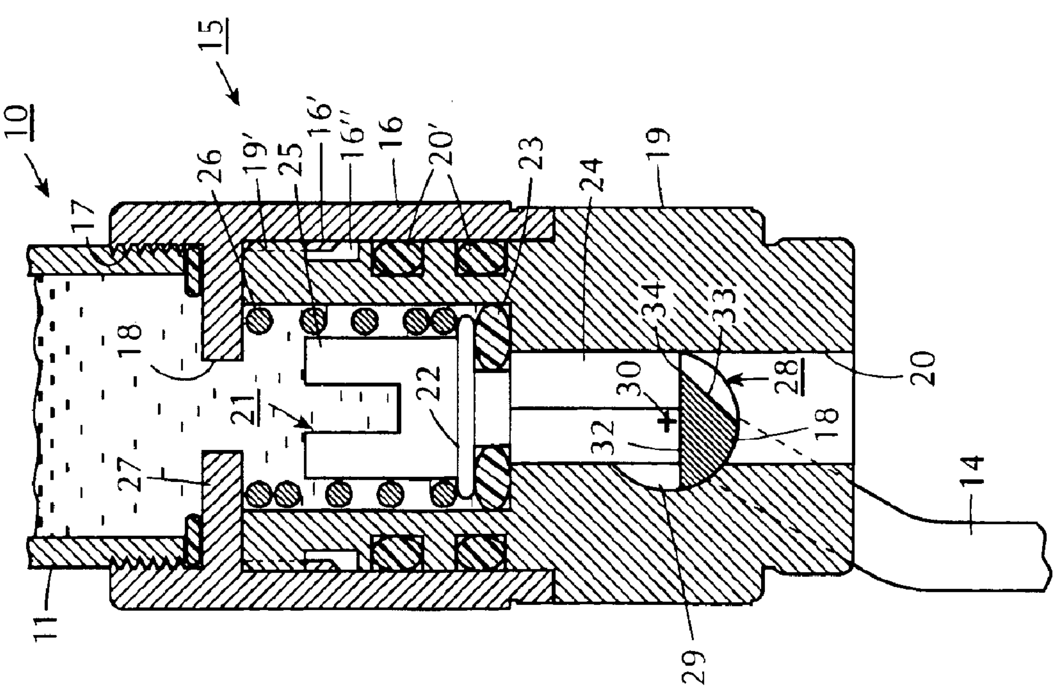
FIG. 3A illustrates a cross-sectional view taken on line 3A—3A of FIG. 2A.

Referring to FIGS. 3A and 3B, the spout attachment 10 has a two-piece housing 15. A first piece 16 of the housing 15 includes an internally threaded end 17 for securement to the water faucet spout 11 and has a passage 18 for a flow of water therethrough. The second piece 19 of the housing 15 is secured to the first piece 16 in coaxial relation and includes a passage 20 for a flow of water.

As illustrated, the upper housing piece 16 has a female thread 16' while the lower housing piece 19 has a male thread 19'. The axial extent of the female thread 16' is less than that of the male thread 19' so that the two pieces 16,19 can be threaded together until the female thread 16' passes beyond the male thread 19' into a clearance cavity 16", i.e. an unthreaded section, in the lower housing piece 19.

Thus, after the upper housing piece 16 is threaded onto the water spout 11 and the female thread 16' is within the plane of the clearance cavity 16", i.e. out of threaded engagement with the male thread 19', the lower housing piece 19 is free to rotate relative to the upper housing piece 16 to permit indexing of the handle 14 during installation on the water spout 11 for proper use.

A pair of O-ring seals 20' are located in respective grooves of the lower housing piece 19 to seal the surfaces between the two housing pieces 16, 19 and each seal 20' is compressed in place to provide a tight fit between the two pieces 16,19 in order to hold the lower housing piece 16 and handle 11 in an assembled position of use. If an adjustment is required over time, the lower piece 19 may be grasped and manually turned to re-align the handle 11.

A valve body 21 is mounted in the second housing piece 19 for movement between a retracted position, as illustrated in FIG. 3B, to allow water to flow from the passage 18 into the passage 20, as indicated by arrows, and an extended position, as illustrated in FIG. 3A, to block a flow of water from the passage 18 into the passage 20 in the lower housing piece 19.

The valve body 21 is provided with an annular collar 22 for seating on an O-ring 23, that in turn, slides in the lower housing piece 19 as the valve body 21 moves up and down in the housing piece 19. As shown in FIG. 3A, the O-ring 23 is received in an annular recess in the valve body 21 and is compressed by the collar 22 against the housing piece 19 when in the extended position. As shown in FIG. 3B, when the valve body 21 is in the retracted position, the O-ring 23 is spaced from the housing 19 to permit a flow of water from the passage 18 about the valve body 21 and O-ring 23 into the passage 20.

The valve body 21 has a first section 24 below the collar 22 that is located in the passage 20 and is of a cross-section, for example, square, to permit a flow of water thereby. The valve body 21 also has an upper section 25 above the collar 22 that is shaped with a cross-section to permit a flow of water thereby.

The valve body 21 may be shaped in any suitable manner to permit a flow of water about the periphery of the valve body 21 when the valve body 21 is in the retracted position of FIG. 3B with the annular collar 22 spaced from the passage 20.

A spring 26 is disposed in the housing piece 19 and abuts against an annular internal flange 27 of the upper housing piece 16 for biasing the valve body 21 from the retracted position of FIG. 3B to the extended position of FIG. 3A. As indicated, the spring 26 is a coil spring and is located between the annular flange 27 and the annular collar 22.

The spout attachment 10 also has a cam 28 that is rotatably mounted in the lower housing piece 19 in abutment with the valve body 21 for moving the valve body from the extended position of FIG. 3A to the retracted position of FIG. 3B. This cam 28 includes a pair of end sections 29 (only one of which is illustrated) for rotation about a central axis 30. In addition, the cam 28 has an intermediate section 31 having a segmented cross-section. As illustrated, the intermediate section 31 has a flat surface 32 engaging the valve body 21 in the extended position of FIG. 3A. The intermediate section 31 also has a second flat surface 33 that defines an edge surface 34 with the first flat surface 32. This edge surface 34 is positioned to engage the valve body 21 in the fully retracted position of FIG. 3B. As illustrated, the handle 14 is rotatable 90° to move the valve body 21 from the extended position of FIG. 3A to the retracted position of FIG. 3B. The retracted position of FIG. 3B corresponds to the "hold open" position between positions B and C of FIG. 1.

The cam 28 is multi-functional. When the cam is rotated in either a clockwise or counter-clockwise direction, as viewed, the cam 28 functions as a "spring return" when the handle is between positions D and C (see FIG. 1) When the handle 14 is rotated beyond position C towards position B to the "hold open" position, the cam 28 functions to hold the handle 11 in place. When the handle 14 is pushed beyond the "hold open" position to position B, the spring 26 biases the cam 28 to position C.

Figure 2B:
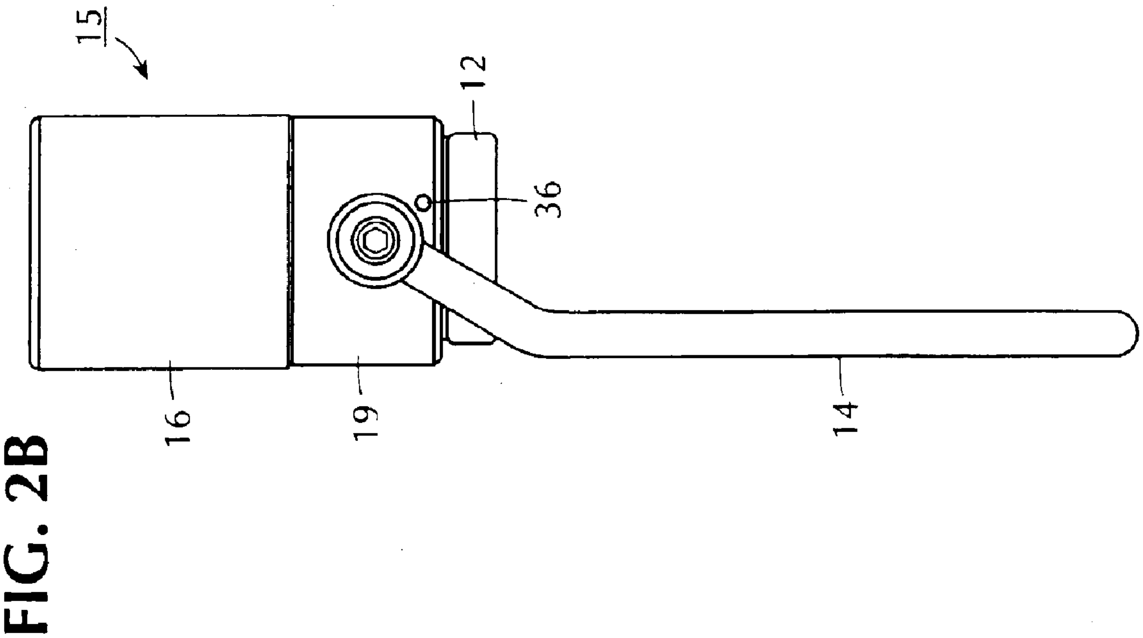
FIG. 2B illustrates a side-view of the faucet spout attachment according to the invention.
Figure 2A:
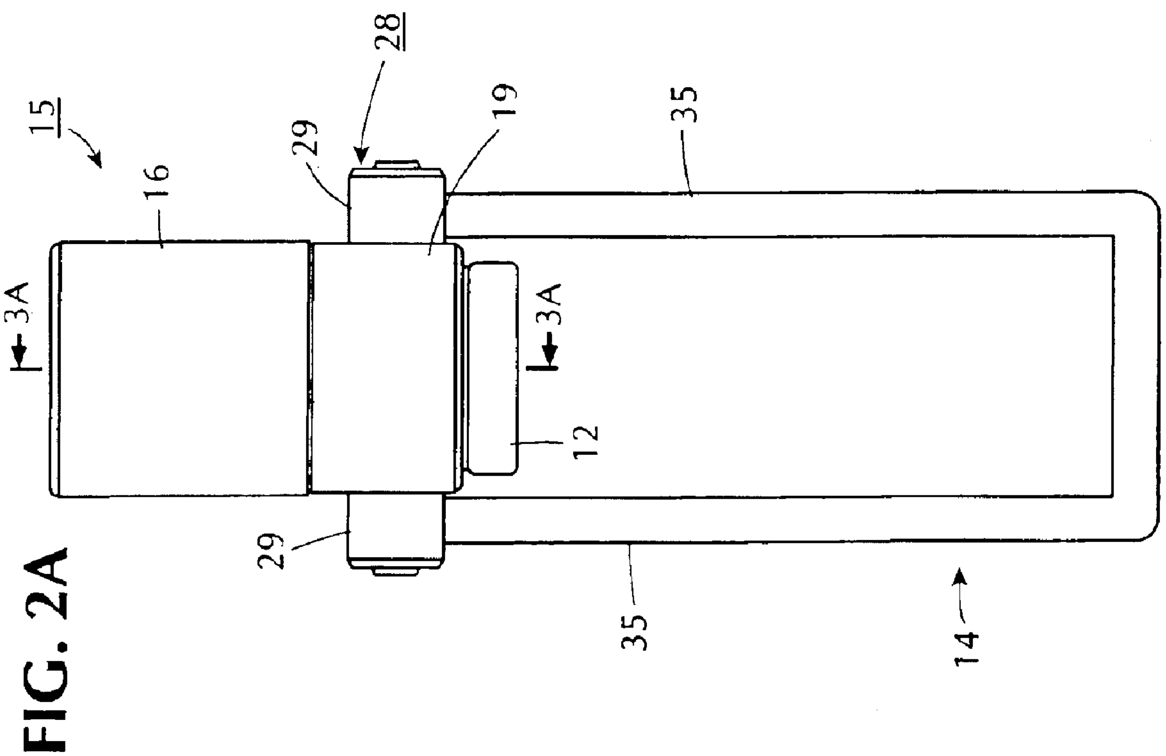
FIG. 2A illustrates a front view of a faucet spout attachment of FIG. 1.

Referring to FIGS. 2A and 2B, the handle 14 is of U-shaped construction and has a pair of legs 35, each of which fits into an aperture (not shown) of a cylindrical end section of the cam 28.

Referring to FIG. 1, when the handle 14 is moved rearwardly to the position D, the cam 28 rotates clockwise, as viewed in FIG. 3A, to raise the valve body 21 towards the extended position. Upon reaching the fully extended position corresponding to position D in FIG. 1, the valve body 21 abuts the flange 27 of the housing piece 16. Continued upward motion is then prevented. However, at this time, the flat surface 32 of the cam 28 remains in contact with the valve body 21 so that, upon manual release, the spring 26 returns the valve body 21 to the extended position of FIG. 3A. During this time, the handle 14 is also spring-biased back to the rest position of FIG. 1.

The handle 14 may also be moved into a forward position C against the bias of the spring 26. Thus, position C is located between the positions illustrated in FIGS. 3A and 3B.

As indicated in FIG. 1, a pin 36 may be inserted into the lower housing piece 19 to project into the path of the handle 14 so as to block further forward motion of the handle 14 from the position C to the upper stop position B that is located 1800 from position D.

Referring to FIGS. 1 and 3B, when the handle 14 is moved forwardly into the "hold open" position between position C and position B, the flat surface 32 of the cam 28 is vertical and in line with the valve body 21. At this time, only the edge surface 34 of the cam 28 contacts the valve body 21.

Consequently, with the force of the spring 26 aligned with the flat surface 32 of the cam 28, the valve body 21 is locked in the "hold open" position. This position corresponds to a position between positions B and C in FIG. 1. In order to move the handle 14 from this locked position, the handle 14 requires manual actuation.

The upper limit of the handle 14 is indicated as position B in FIG. 1. When released in this position, the handle 14 will spring back to the "hold open" position between positions B and C and corresponding to the position shown in FIG. 3*b*. If the strength of the spring 26 is sufficient, the inertia of the moving handle 14 may be sufficient to have the handle 14 pass through the "hold open" position without stopping and return to the rest position.

Where desired, a coating of anti-microbial nature may be placed on the handle 14 for hygenic purposes.

The invention thus provides a faucet spout attachment that can be easily manipulated to open and close a faucet and placed in a "hold open" position for ease of use.

Further, the invention provides a faucet spout attachment that can be easily mounted on a water spout and adjusted into a proper position for use.

Still further, the invention provides a faucet spout attachment that is of economical construction. As such, the faucet is readily adaptable for use in commercial kitchens and public restrooms particularly in those locations that have a "hand wash station" government regulation per number of employees in food estabishments.

What is claimed is:

1. A faucet spout attachment comprising a housing having a first piece including an internally threaded end for securement to a water faucet spout and a first passage for a flow of water therethrough and a second piece secured to said first piece in coaxial relation and including a second passage for a flow of water therethrough;

a valve body mounted in said second piece for movement between a retracted position allowing water to flow from said first passage into said second passage and an extended position within said second piece to block a flow of water from said first passage into said second passage;

a spring disposed in said second piece for biasing said valve body from said retracted position towards said extended position;

a cam rotatably mounted in said second piece in abutment with said valve body for moving said valve body from said extended position toward said retracted position; and a handle secured to said cam and depending from said housing for rotating said cam to allow a flow of water to flow from said housing.

2. A faucet attachment as set forth in claim 1 further comprising an annular ring seal seated in said valve body.

3. A faucet attachment as set forth in claim 2 wherein said valve body has an annular collar for seating on said ring in said extended position thereof.

4. A faucet attachment as set forth in claim 3 wherein said valve body has a first section on one side of said collar and in said second passage of a cross-section to permit a flow of water thereby and a second section on an opposite side of said collar of a cross-section to permit a flow of water thereby.

5. A faucet attachment as set forth in claim 1 wherein said cam has a pair of end sections of cylindrical cross-section and an intermediate section having a segmented cross-section.

6. A faucet attachment as set forth in claim 5 wherein said intermediate section has a first flat surface engaging said valve body in said extended position thereof and an edge surface engaging said valve body in said retracted position thereof.

7. A faucet attachment as set forth in claim 6 wherein said intermediate section has a second flat surface defining said edge surface with said first flat surface.

8. A faucet attachment as set forth in claim 7 wherein said handle is rotatable over an angle of 90° to move said valve body from said extended position to said retracted position.

9. A faucet attachment as set forth in claim 7 where said handle is rotatable from a first depending rest position with said first flat surface of said intermediate section of said cam in engagement with said valve body to a raised locked position with said first flat surface perpendicular to said valve body.

10. A faucet attachment as set forth in claim 7 wherein said handle is manually pivotable from a rest position with said first flat surface of said intermediate section of said cam in engagement with said valve body to a rearward position against a bias of said spring whereby upon release said handle is spring biased from said rearward position into said rest position.

11. A faucet attachment as set forth in claim 7 wherein said handle is manually pivotable from a rest position with said first flat surface of said intermediate section of said cam in engagement with said valve body to a forward position against a bias of said spring whereby upon release said handle is spring biased from said forward position into said rest position.

12. A faucet attachment as set forth in claim 7 wherein said handle is manually pivotable from a rest position with said first flat surface of said intermediate section of said cam in engagement with said vale body to a forward locked position against a bias of said spring whereby upon release said handle remains in said locked position.

13. A faucet attachment as set forth in claim 1 wherein said first piece and said second piece of said housing are rotatable relative to each other to permit alignment of said handle for use.

14. A faucet attachment as set forth in claim 13 further comprising at least one O-ring compressed between said first piece of said housing and said second piece of said housing to provide a tight fit between said pieces.

15. A faucet spout attachment comprising a housing having a passage for a flow of water therethrough;

a valve body mounted in said housing for movement between a retracted position allowing water to flow from said housing and an extended position to block a flow of water from said housing, said valve body having an annular collar, a first section above said collar of a cross-section to permit a flow of water thereby and a second section below said collar and within said passage to permit a flow of water through said passage;

an O-ring seated in said valve body below said collar for seating of said collar thereon in said extended position to block a flow of water into said passage;

a spring disposed in said housing for biasing said valve body from said retracted position towards said extended position;

a cam rotatably mounted in said housing in abutment with said valve body for moving said valve body from said extended position toward said retracted position; and a handle secured to said cam and depending from said housing for rotating said cam to allow a flow of water to flow from said housing.

16. A faucet attachment as set forth in claim 15 wherein said cam has an intermediate section having a segmented cross-section with a first flat surface engaging said valve body in said extended position thereof and being disposed perpendicularly of said valve body in said retracted position thereof.

17. A faucet attachment as set forth in claim 16 wherein said intermediate section has a second flat surface defining an edge surface with said first flat surface.

18. A faucet attachment as set forth in claim 15 wherein said housing has a first piece for threading onto a waterspout and a second piece rotatably mounted on said first piece to permit alignment of said handle for use.

19. A faucet attachment as set forth in claim 18 further comprising at least one O-ring compressed between said first piece of said housing and said second piece of said housing to provide a tight fit between said pieces.

20. A faucet spout attachment comprising a housing having a passage for a flow of water therethrough, said housing having a first piece for threading onto a waterspout and a second piece rotatably mounted on said first piece;

a valve body mounted in said housing for movement between a retracted position allowing water to flow from said housing and an extended position to block a flow of water from said housing;

a spring disposed in said housing for biasing said valve body from said retracted position towards said extended position;

a cam rotatably mounted in said housing in abutment with said valve body for moving said valve body from said extended position toward said retracted position, said cam having an intermediate section having a segmented cross-section with a first flat surface engaging said valve body in said extended position thereof and being disposed perpendicularly of said valve body in said retracted position thereof; and a handle secured to said cam and depending from said second piece of said housing for rotating said cam to allow a flow of water to flow from said housing, said handle being rotatable with said second piece to permit alignment of said handle for use.

21. A faucet attachment as set forth in claim 20 further comprising at least one O-ring compressed between said first piece of said housing and said second piece of said housing to provide a tight fit between said pieces.

22. A faucet spout attachment comprising a housing a passage for a flow of water therethrough;

a valve body mounted in said housing for movement between a retracted position allowing water to flow from said housing and an extended position to block a flow of water from said housing;

a spring disposed in said housing for biasing said valve body from said retracted position towards said extended position;

a cam rotatably mounted in said housing in abutment with said valve body for moving said valve body from said extended position toward said retracted position, said cam having an intermediate section having a segmented cross-section with a first flat surface engaging said valve body in said extended position thereof and being disposed perpendicularly of said valve body in said retracted position thereof, said intermediate section having a second flat surface defining an edge surface with said first flat surface; and a handle secured to said cam and depending from said housing for rotating said cam to allow a flow of water to flow from said housing.

23. A faucet spout attachment comprising a housing a passage for a flow of water therethrough, said housing having a first piece for threading onto a water-spout and a second piece rotatably mounted on said first piece;

a valve body mounted in said housing for movement between a retracted position allowing water to flow from said housing and an extended position to block a flow of water from said housing;

a spring disposed in said housing for biasing said valve body from said retracted position towards said extended position;

a cam rotatably mounted in said housing in abutment with said valve body for moving said valve body from said extended position toward said retracted position; and a handle secured to said cam and depending from said housing for rotating said cam to allow a flow of water to flow from said housing wherein said handle is aligned by rotation of said second piece.

24. A faucet attachment as set forth in claim 23 further comprising at least one O-ring compressed between said first piece of said housing and said second piece of said housing to provide a tight fit between said pieces.

* * * * *

UNITED STATES PATENT AND TRADEMARK OFFICE

CERTIFICATE OF CORRECTION

PATENT NO. : 6,994,318 B2

DATED : February 7, 2006

INVENTOR(S) : David J. Burke

It is certified that error appears in the above-identified patent and that said Letters Patent is hereby corrected as shown below:

Column 4,
Line 37, “1800” should be -- 180º --.

Column 6,
Line 11, “vale” should be -- valve --.

Signed and Sealed this

Sixth Day of June, 2006

JON W. DUDAS

*Director of the United States Patent and Trademark Office*